United States Patent
Suzuki et al.

(10) Patent No.: US 10,899,343 B2
(45) Date of Patent: Jan. 26, 2021

(54) PARKING ASSISTANCE METHOD AND PARKING ASSISTANCE DEVICE

(71) Applicant: Nissan Motor Co., Ltd., Yokohama (JP)

(72) Inventors: Yasuhiro Suzuki, Kanagawa (JP); Ko Sato, Kanagawa (JP); Daisuke Tanaka, Kanagawa (JP); Yasuhiro Sakurai, Kanagawa (JP); Ryota Yamanaka, Kanagawa (JP); Junya Kobayashi, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 16/625,556

(22) PCT Filed: Jul. 7, 2017

(86) PCT No.: PCT/JP2017/025009
§ 371 (c)(1),
(2) Date: Dec. 20, 2019

(87) PCT Pub. No.: WO2019/008762
PCT Pub. Date: Jan. 10, 2019

(65) Prior Publication Data
US 2020/0361449 A1    Nov. 19, 2020

(51) Int. Cl.
*B60W 30/06* (2006.01)
*B60R 11/04* (2006.01)
*G06K 9/00* (2006.01)

(52) U.S. Cl.
CPC ............ *B60W 30/06* (2013.01); *B60R 11/04* (2013.01); *G06K 9/00798* (2013.01);
(Continued)

(58) Field of Classification Search
CPC ............ B60W 30/06; G06K 9/00798; G06K 9/00812; B60R 11/04; B60R 2300/607; B60R 2300/806
See application file for complete search history.

(56) References Cited

U.S. PATENT DOCUMENTS 8,140,209 B2 * 3/2012 Adachi ............ G06K 9/00812
701/23
9,950,742 B2   4/2018 Choi et al.
(Continued)

FOREIGN PATENT DOCUMENTS

CN   109843676 A   6/2019
JP   2014-193662 A   10/2014
(Continued)

*Primary Examiner* — Ryan W Sherwin
(74) *Attorney, Agent, or Firm* — Young Basile Hanlon & MacFarlane, P.C.

(57) ABSTRACT

A parking assistance method of a parking assistance device for generating a peripheral image indicating a periphery of a vehicle as viewed from above to detect an unoccupied parking space, and displaying, on the peripheral image, an assistance image indicating that the detected unoccupied parking space is an available parking space, determines whether the vehicle intrudes on the unoccupied parking space. The parking assistance method inhibits the assistance image from being displayed on the unoccupied parking space on which the vehicle is determined to intrude in the peripheral image.

8 Claims, 11 Drawing Sheets

(52) U.S. Cl.
CPC .... *G06K 9/00812* (2013.01); *B60R 2300/607* (2013.01); *B60R 2300/806* (2013.01)

(56) References Cited

U.S. PATENT DOCUMENTS

| | | | | |
|---|---|---|---|---|
| 10,155,541 | B2* | 12/2018 | Noh | B62D 15/021 |
| 10,198,950 | B2* | 2/2019 | Hayakawa | G08G 1/14 |
| 2002/0041239 | A1* | 4/2002 | Shimizu | B62D 15/027 |
| | | | | 340/932.2 |
| 2002/0123829 | A1* | 9/2002 | Kuriya | B62D 15/0275 |
| | | | | 701/1 |
| 2003/0080877 | A1* | 5/2003 | Takagi | B60R 1/00 |
| | | | | 340/932.2 |
| 2004/0105579 | A1* | 6/2004 | Ishii | B60R 1/00 |
| | | | | 382/154 |
| 2006/0255969 | A1* | 11/2006 | Sakakibara | G08G 1/161 |
| | | | | 340/932.2 |
| 2007/0057816 | A1* | 3/2007 | Sakakibara | B62D 15/0275 |
| | | | | 340/932.2 |
| 2007/0088474 | A1* | 4/2007 | Sugiura | B62D 15/0275 |
| | | | | 701/36 |
| 2009/0243888 | A1* | 10/2009 | Kawabata | B62D 15/028 |
| | | | | 340/932.2 |
| 2010/0049402 | A1* | 2/2010 | Tanaka | B60R 1/00 |
| | | | | 701/41 |
| 2010/0070139 | A1* | 3/2010 | Ohshima | B60R 1/00 |
| | | | | 701/42 |
| 2014/0039760 | A1* | 2/2014 | Lee | B62D 15/0295 |
| | | | | 701/41 |
| 2016/0075377 | A1* | 3/2016 | Tomozawa | B60R 1/00 |
| | | | | 701/41 |
| 2016/0284217 | A1 | 9/2016 | Lee et al. | |
| 2016/0371983 | A1* | 12/2016 | Ronning | G08G 1/09626 |
| 2017/0001563 | A1* | 1/2017 | Fukushima | B60R 1/00 |
| 2017/0029027 | A1* | 2/2017 | Mizutani | B62D 6/002 |
| 2017/0080976 | A1 | 3/2017 | Choi et al. | |
| 2018/0099661 | A1 | 4/2018 | Bae et al. | |
| 2018/0327028 | A1* | 11/2018 | Kamiyama | B60W 30/06 |
| 2019/0144037 | A1* | 5/2019 | Yoshimura | G08G 1/16 |
| | | | | 701/34.4 |
| 2020/0062242 | A1* | 2/2020 | Hayakawa | B62D 15/0285 |

FOREIGN PATENT DOCUMENTS

| | | |
|---|---|---|
| JP | 2018039294 A | 3/2018 |
| KR | 20130138517 A | 12/2013 |
| KR | 20160114486 A | 10/2016 |
| KR | 20170034658 A | 3/2017 |
| WO | 2012143033 A1 | 10/2012 |
| WO | 2017/068701 A1 | 4/2017 |
| WO | 2017/072894 A1 | 5/2017 |
| WO | 2018070583 A1 | 4/2018 |

* cited by examiner

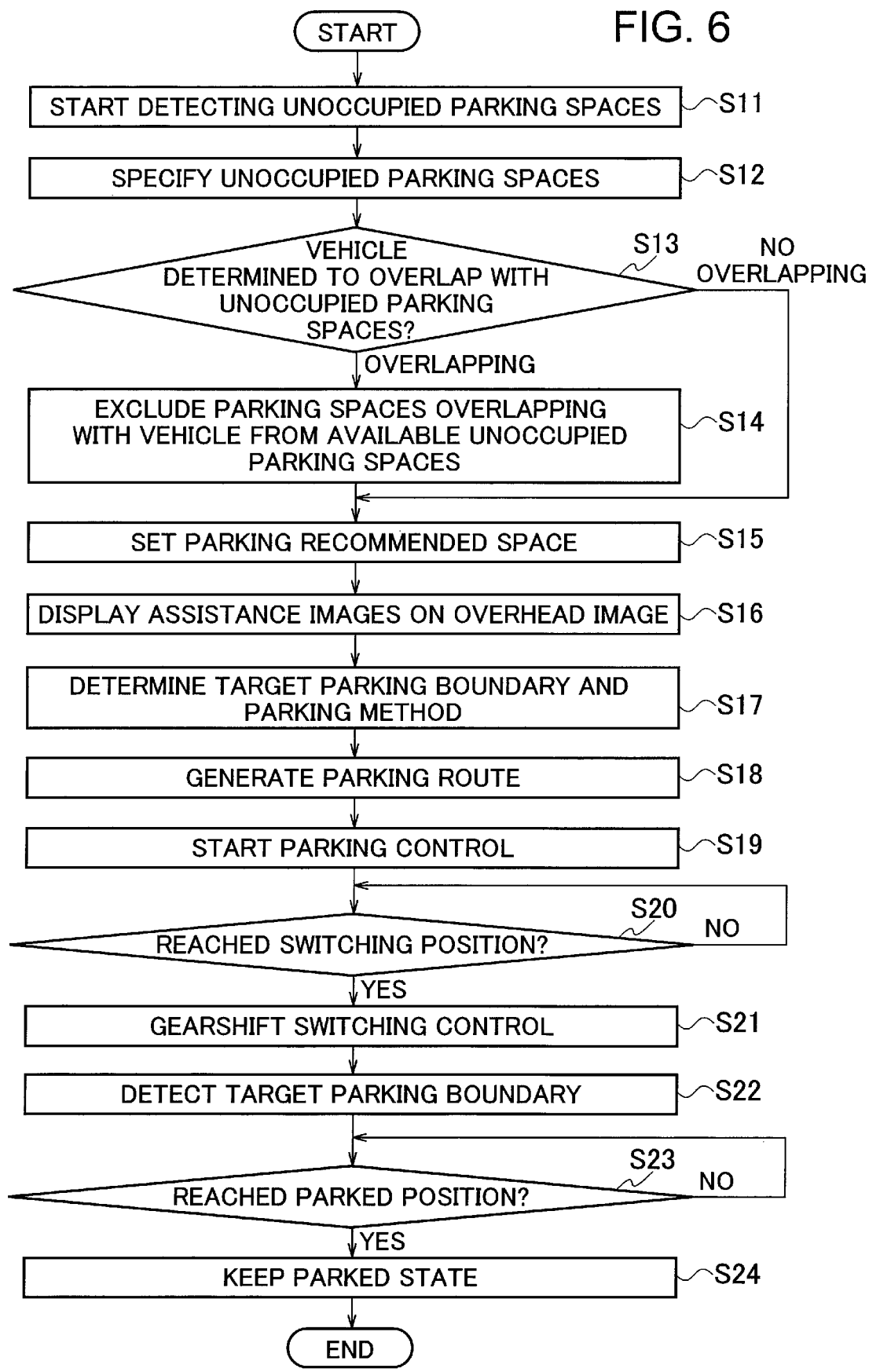

PARKING ASSISTANCE METHOD AND PARKING ASSISTANCE DEVICE

TECHNICAL FIELD

The present invention relates to a parking assistance method and a parking assistance device.

BACKGROUND

A parking assistance method is known that looks for unoccupied parking spaces and preferentially displays a parking space recommended for parking, as disclosed in WO 2012/143033. The method disclosed in WO 2012/143033 determines a degree of difficulty of parking based on the conditions such as a distance from a vehicle (a moving object), a time necessary for parking, and easiness of leaving a parking space, and preferentially displays a parking space easier to park in when there are several unoccupied parking spaces.

SUMMARY

The method disclosed in WO 2012/143033 keeps detecting a parking boundary between unoccupied parking spaces partly hidden by the moving object intruding on the corresponding parking spaces, which may fail to display assistance images at appropriate positions so as to indicate available unoccupied parking spaces appropriately.

To solve the conventional problem described above, the present invention provides a parking assistance method and a parking assistance device capable of displaying an assistance image at an appropriate position when a moving object intrudes on an unoccupied parking space.

A parking assistance method according to an aspect of the present invention determines whether a moving object intrudes on an unoccupied parking space, and inhibits an assistance image from being displayed on the unoccupied parking space on which the moving object is determined to intrude in a peripheral image.

The aspect of the present invention inhibits the assistance image from being displayed on the unoccupied parking space on which the moving object is determined to intrude, so as to indicate the assistance image at an appropriate position.

BRIEF DESCRIPTION OF THE DRAWINGS

FIG. 6 is a flowchart showing a process of processing executed by a parking assistance device according to a first embodiment of the present invention;

DETAILED DESCRIPTION

Hereinafter, embodiments according to the present invention will be described with reference to the drawings. The respective embodiments described below are illustrated with a vehicle as a moving object.

[Explanation of Configuration of First Embodiment]

Figure 1:
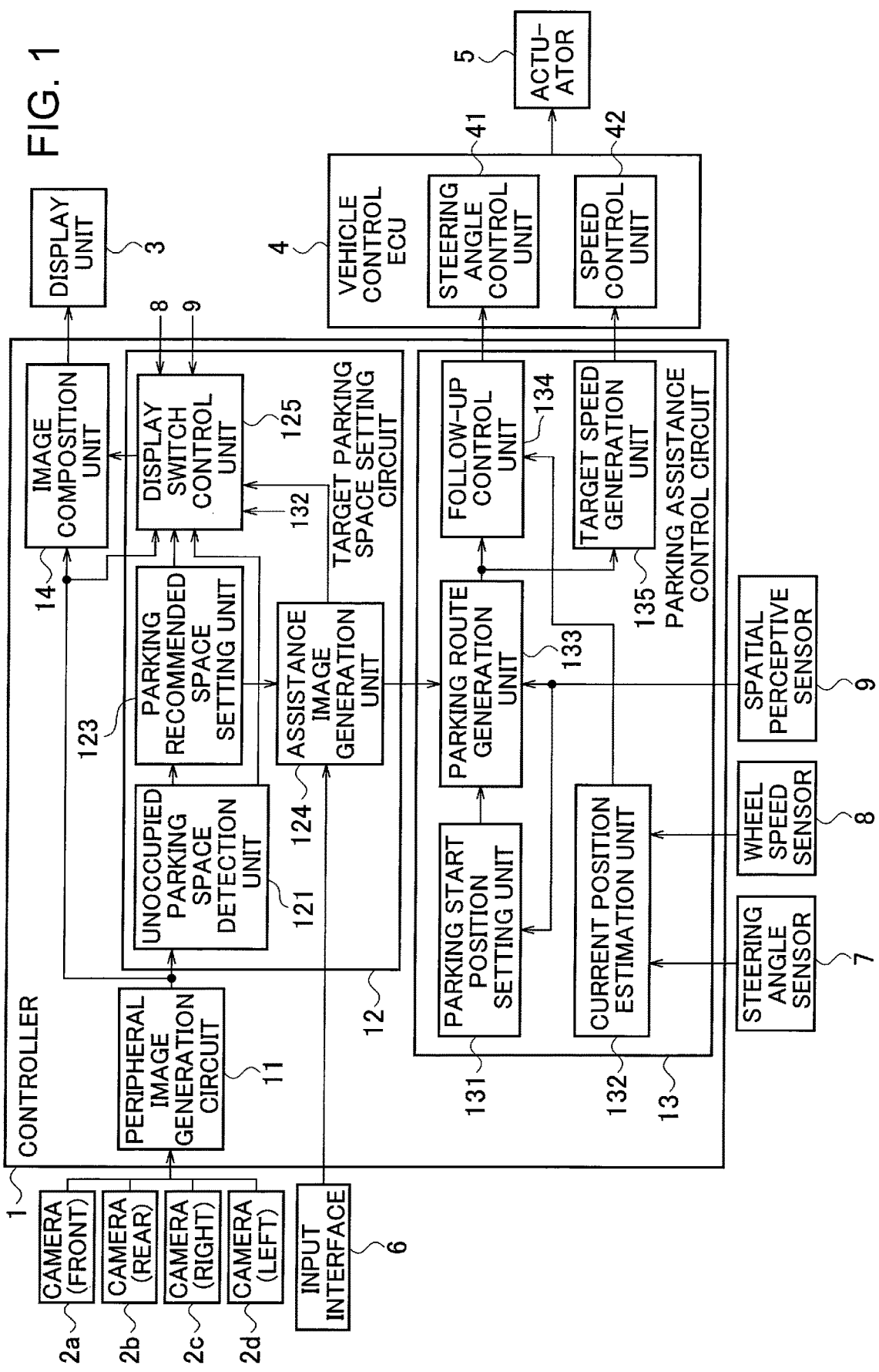
FIG. 1 is a block diagram showing a configuration of a parking assistance device according to an embodiment of the present invention.

FIG. 1 is a block diagram showing a configuration of a parking assistance device to which a parking assistance method according to a first embodiment of the present invention is applied. As used in the present embodiment, the term "parking" refers to a process of moving toward an unoccupied parking space to come to a stop in the parking space. As for an automobile, the term "parking" refers to a process of moving to an unoccupied parking space in a parking lot to come to a stop so as to park the automobile in the parking space. As used in the present embodiment, the term "parking assistance control" includes a process of indicating an unoccupied parking space as a target for parking around a host vehicle to an occupant, notifying the occupant of parking operations toward the parking target, and executing autonomous parking to autonomously park in the parking target.

As shown in FIG. 1, the parking assistance device according to the present embodiment includes a controller 1, cameras 2a, 2b, 2c, 2d, a display unit 3, a vehicle control ECU 4, and an actuator 5. The controller 1 is connected with an input interface 6, a steering angle sensor 7, a wheel speed sensor 8, and a spatial perceptive sensor 9.

The input interface 6 is a terminal through which the occupant in the vehicle inputs various kinds of information on parking, and is a joystick or an operation switch. A touch panel provided in the display unit 3 may also be used as the input interface 6.

The camera 2a is mounted on the front side of the vehicle to capture a front-side image of the vehicle. The camera 2b is mounted on the rear side of the vehicle to capture a rear-side image of the vehicle. The camera 2c is mounted on the right side of the vehicle to capture a left-side image of the vehicle. The camera 2d is mounted on the left side of the vehicle to capture a right-side image of the vehicle. The respective cameras are mounted below the roof of the vehicle.

Since the respective cameras 2a to 2d are located below the roof of the vehicle, an image captured from above the vehicle cannot be actually displayed. Namely, any actual image of the vehicle captured by the respective cameras is not available. The parking assistance device thus uses a vehicle icon (an image imitating the vehicle) instead of the actual image of the vehicle.

The display unit 3 can be a liquid crystal display for vehicle navigation installed in the compartment, or an existing monitor attached to a remote control terminal.

The vehicle control ECU 4 includes a steering angle control unit 41 for controlling a steering angle of the vehicle, and a speed control unit 42 for controlling a speed of the vehicle, and is connected to the actuator 5 for driving, braking, and steering the vehicle.

The controller 1 includes a peripheral image generation circuit (a peripheral image generation unit) for generating an overhead image 11 (an image viewed from above) of the vehicle based on images captured by the respective cameras 2a to 2d, a target parking space setting circuit 12 for setting a parking space as a target for parking the vehicle, a parking assistance control circuit 13 for assisting in parking the vehicle in the target parking space set by the target parking space setting circuit 12, and an image composition unit 14.

The controller 1 can be implemented by a microcomputer including a central processing unit (CPU), a memory, and an input-output unit. A computer program for fabricating the controller 1 is installed on the microcomputer and is executed, so that the microcomputer functions as the peripheral image generation circuit 11, the target parking space setting circuit 12, the parking assistance control circuit 13, and the image composition unit 14 included in the controller 1. Alternatively, dedicated hardware can be used to implement the respective functions of the controller 1. The controller 1 is not necessarily installed in the vehicle, and may be implemented through the communication with a base station.

The peripheral image generation circuit 11 sets a preliminarily determined virtual visual point and projected plane based on the peripheral images captured by the four cameras 2a to 2d, so as to generate an image as downwardly viewed from above the vehicle (in the direction toward the vehicle). This image is referred to as an "overhead image". The overhead image is an image of the periphery of the vehicle as viewed from above the vehicle. A method of generating an overhead image is well-known, and specific explanations are omitted below. The present embodiment does not necessarily use the overhead image, and is only required to use an image that indicates the periphery of the vehicle (a peripheral image), such as a bird's-eye image.

Alternatively, the peripheral image generation circuit 11 may receive images captured by cameras installed in a parking lot or cameras installed in other vehicles so as to generate the overhead image. The present embodiment does not necessarily display the image imitating the vehicle (the icon of the vehicle) when using an image captured from above the vehicle.

The target parking space setting circuit 12 includes an unoccupied parking space detection unit 121, a parking recommended space setting unit 123 (a parking recommended space setting circuit), an assistance image generation unit 124, and a display switch control unit 125 (an image display circuit). The vehicle is led to enter to park in a target parking space by manual driving or autonomous driving.

The unoccupied parking space detection unit 121 detects unoccupied parking spaces from the overhead image generated by the peripheral image generation circuit 11. The unoccupied parking space detection unit 121 detects parking boundaries by detecting partition lines such as white lines present in the overhead image so as to recognize regions defined by the parking boundaries as parking spaces. Alternatively, the unoccupied parking space detection unit 121 may detect parking boundaries by use of a spatial perceptive sensor such as an infrared radar, a laser range finder (LRF), or a camera. The unoccupied parking space detection unit 121 further determines whether vehicles are parked within the detected parking boundaries by image processing. The unoccupied parking space detection unit 121 detects a parking boundary in which no vehicle is parked as an unoccupied parking space.

The parking recommended space setting unit 123 sets, as a parking recommended space, an unoccupied parking space determined to be easiest to park in among the unoccupied parking spaces detected by the unoccupied parking space detection unit 121, while taking account of the conditions such as a distance from the vehicle, the presence or absence of a gradient, a time necessary for parking, and easiness of leaving the parking space.

The assistance image generation unit 124 outputs assistance images to the display switch control unit 125 indicating unoccupied parking spaces determined to be available by the display switch control unit 125. The assistance image generation unit 124 is also connected with the input interface 6. When an input signal for setting a parking space is input from the input interface 6, the assistance image generation unit 124 recognizes the parking boundary of the parking space set by the input signal (hereinafter referred to as a "target parking boundary"). The assistance image generation unit 124 generates a parking boundary image of the target parking boundary (refer to reference numeral 52 in FIG. 4A), and outputs the image to the display switch control unit 125.

In particular, when unoccupied parking spaces are determined to be available by the display switch control unit 125, the assistance image generation unit 124 outputs and allots the assistance images to the corresponding unoccupied parking spaces. When the parking target is set on which the parking assistance is performed, the assistance image generation unit 124 generates the assistance image indicating the parking target as an available unoccupied parking space (the parking boundary image showing the target parking boundary, for example) to output the image to the display switch control unit 125. In addition, when the parking recommended space is detected from the plural unoccupied parking spaces, the assistance image generation unit 124 outputs the assistance image indicating the parking recommended space as an available unoccupied parking space to the display switch control unit 125. In addition, when the unoccupied parking spaces are detected around the vehicle, the assistance image generation unit 124 outputs the assistance images indicating the unoccupied parking spaces to the display switch control unit 125. The assistance image indicating the parking target, the assistance image indicating the parking recommended space, and the assistance images indicating the unoccupied parking spaces may be displayed distinguishably. The parking assistance processing to be performed on the parking target, the parking recommended space, or the unoccupied parking spaces is as described above.

The display switch control unit 125 controls the assistance images generated by the assistance image generation unit 124 to be indicated on the overhead image. The display switch control unit 125 uses the information acquired from the spatial perceptive sensor 9, the peripheral image generation circuit 11, and a current position estimation unit 132 so as to determine whether the vehicle intrudes on unoccupied parking spaces. The determination of whether the vehicle intrudes on unoccupied parking spaces may be made by use of the image generated by the peripheral image generation circuit 11, or may be made in accordance with a relationship between peripheral conditions detected by the spatial perceptive sensor 9 and the own position of the vehicle detected by the current position estimation unit 132. The display switch control unit 125 switches between displaying the assistance images indicating whether the unoccupied parking spaces are available and inhibiting the assistance images from being displayed, depending on the determination of whether the vehicle intrudes on the unoccupied parking spaces. When the assistance images are inhibited from being displayed, the overhead image (the peripheral image) showing the corresponding unoccupied parking spaces is displayed.

Figure 3:
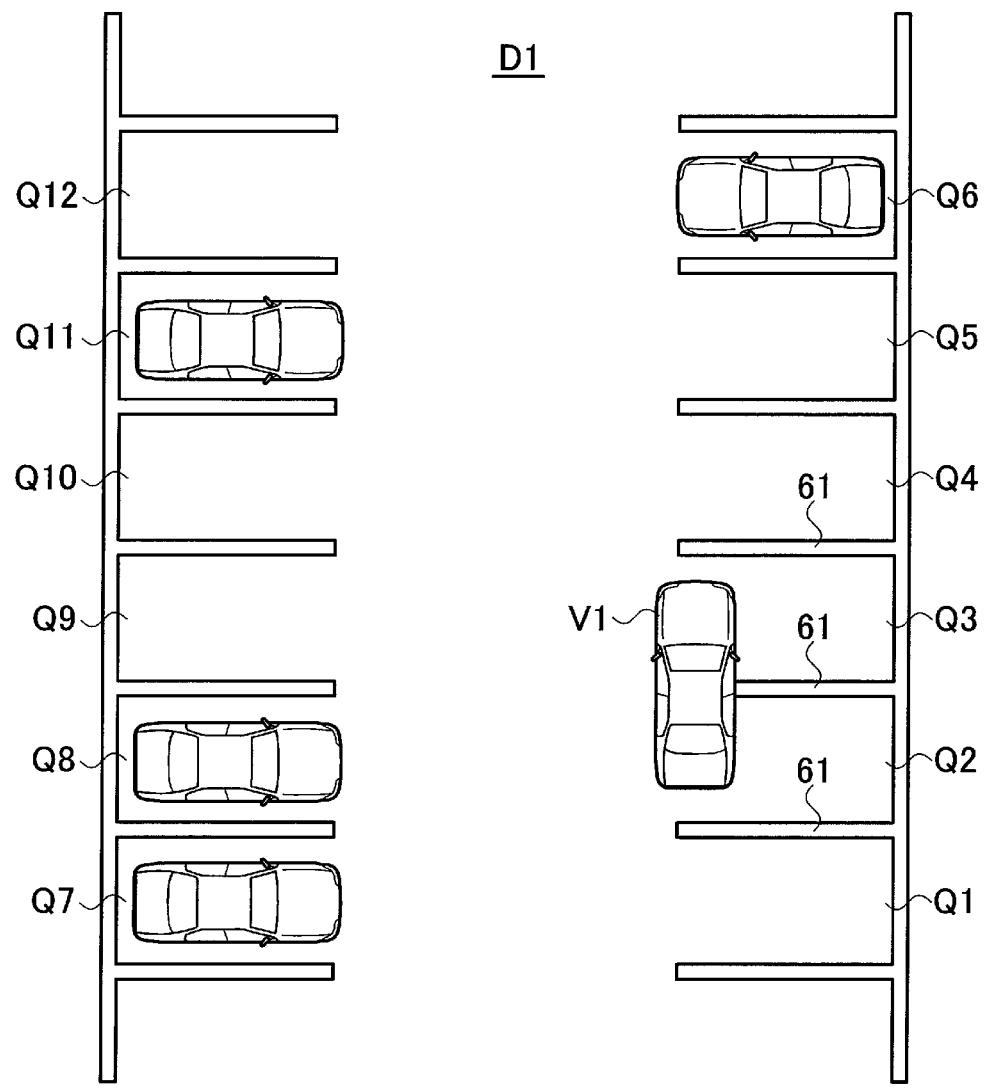
FIG. 3 is an explanatory view showing an overhead image when the vehicle is looking for an unoccupied parking space while intruding on unoccupied parking spaces in the parking lot.

When the vehicle intrudes on parking spaces, for example, when the vehicle V1 entering a parking lot D1 runs on a parking boundary 61 separating the parking spaces Q2 and Q3, as shown in FIG. 3, the display switch control unit 125 inhibits the assistance images from being indicated over the parking spaces Q2 and Q3 separated by the corresponding parking boundary 61. The display switch control unit 125 then sets a parking recommended space selected from the unoccupied parking spaces excluding the parking spaces Q2 and Q3. The method of determining whether the vehicle V1 runs on the parking boundary 61 (whether the vehicle V1 intrudes on unoccupied parking spaces) is described below.

Figure 2:
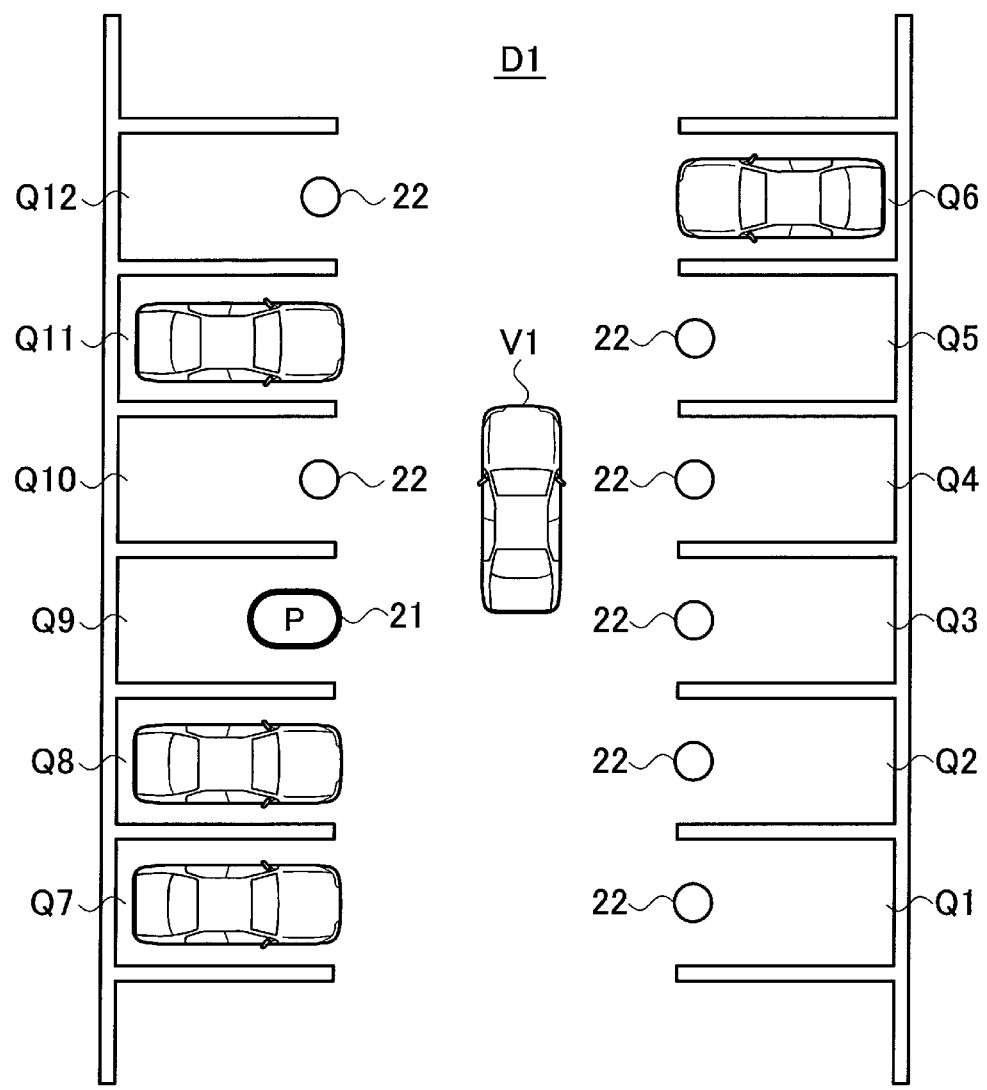
FIG. 2 is an explanatory view showing an overhead image when a vehicle present on a traveling road in a parking lot is looking for an unoccupied parking space.
Figure 4A:
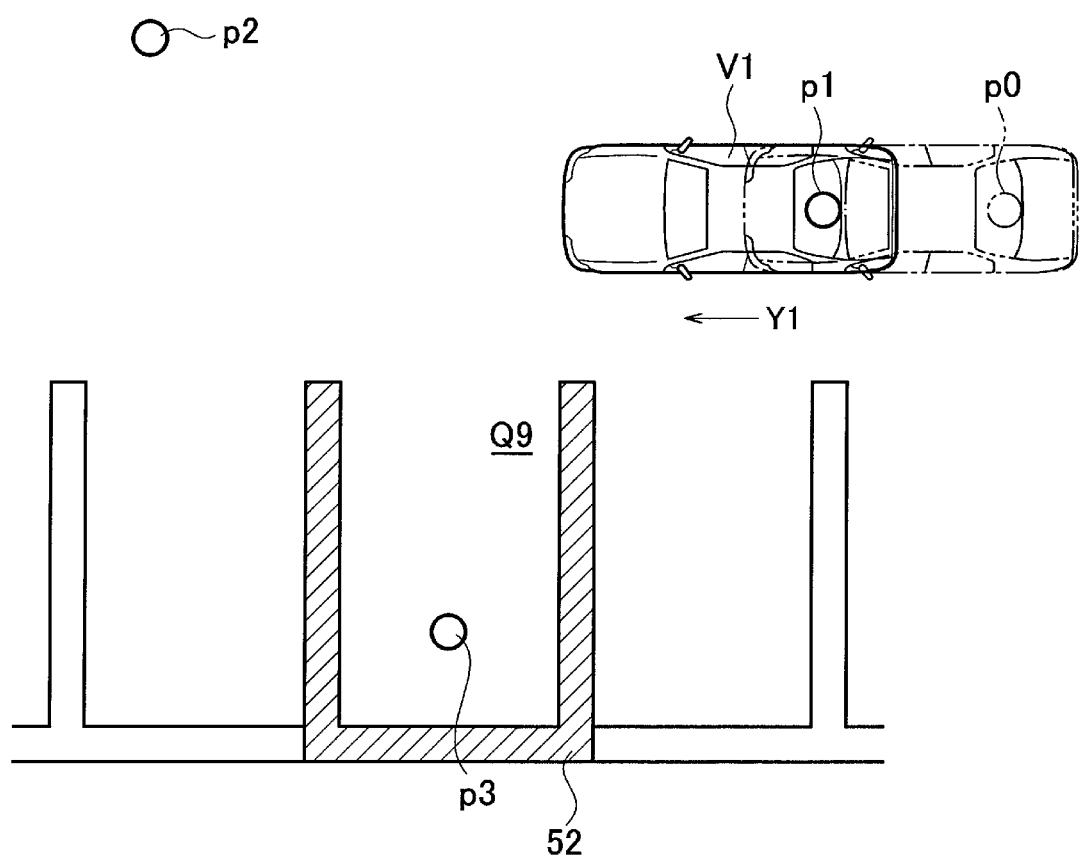
FIG. 4A is a view showing an example of an image including the vehicle and a boundary of a parking space as a parking target.

When the assistance images are output from the display switch control unit 125, the image composition unit 14 combines the overhead image with the assistance images to display the combined image on the display unit 3. FIG. 2 is an explanatory view showing an image in which the assistance image 21 is displayed on the overhead image around the vehicle V1. For example, when the parking space Q9 is set as a parking recommended space selected from the other unoccupied parking spaces, the assistance image 21 is displayed around the parking recommended space Q9 within the overhead image. The occupant of the vehicle V1 thus can recognize the position of the parking recommended space Q9 intuitively. In addition, the parking boundary image of the target parking boundary is displayed on the display unit 3 when output from the display switch control unit 125. As shown in FIG. 4A, for example, the enlarged parking boundary image around the target parking boundary 52 is displayed together with the image of the vehicle V1, so that the occupant can recognize the detailed positional relationship between the target parking boundary 52 and the vehicle V1.

The parking assistance control circuit 13 includes a parking start position setting unit 131, the current position estimation unit 132, a parking route generation unit 133, a follow-up control unit 134, and a target speed generation unit 135, as shown in FIG. 1. The parking assistance control circuit 13 is connected with the steering angle sensor 7, the wheel speed sensor 8, and the spatial perceptive sensor 9.

The steering angle sensor 7 detects a steering angle of the vehicle when parked in an unoccupied parking space (or until the parking is completed). The steering angle sensor 7 when detecting the steering angle of the vehicle may either detect the direction of the tires directly or detect the steering angle from an angle of the steering wheel. The detected steering angle is output to the current position estimation unit 132.

The wheel speed sensor 8 calculates a rotational speed of the wheels. The speed of the vehicle is then detected according to the wheel speed. The detection of the steering angle is not necessarily continuously carried out until the parking is completed, and the steering angle is only required to be calculated at a predetermined timing. The data of the detected speed of the vehicle is output to the current position estimation unit 132.

The spatial perceptive sensor 9 is used for detecting obstacles present around the vehicle, and may be a LRF, for example. The LRF emits an infrared laser beam toward an object, and measures a distance to the object according to the intensity of the reflected light. The measurement by the LRF can acquire the distance to the object as point cloud information. The detected data is output to the parking start position setting unit 131 and the parking route generation unit 133. Alternatively, a clearance sonar using ultrasonic waves, a monocular camera, or a stereo camera including a pair of cameras, for example, can be used as the spatial perceptive sensor 9. The spatial perceptive sensor 9 is only required to detect a distance to an object and the presence or absence of an object.

The parking start position setting unit 131 sets a parking start position when parking the vehicle V1 within the target parking boundary 52. The parking start position setting unit 131 calculates a forward route, a forward distance, a backward route, and a backward distance for moving the vehicle into the target parking boundary in accordance with the detected data of the spatial perceptive sensor 9, so as to set the parking start position based on the calculation results.

The current position estimation unit 132 estimates a current position of the vehicle V1 based on the detected data detected by the wheel speed sensor 8 and the steering angle sensor 7, for example. As for a front-wheel steering vehicle with very low speed, dead reckoning means is typically used for estimating a position and an attitude of the vehicle in accordance with a relationship between a traveling distance on the basis of a rear-wheel axis and a front-wheel steering angle. The dead reckoning is effective in the operation of traveling in a limited section such as a parking operation. Alternatively, the current position can be estimated in accordance with a relative positional relationship between the vehicle V1 and the data detected by the spatial perceptive sensor 9, or a relative positional relationship between the vehicle V1 and white lines on a road surface captured by the cameras 2a to 2d or the object recognition result, for example. The present embodiment estimates that the vehicle V1 is located at a current position p0, as shown in FIG. 4A. The present embodiment also estimates that the attitude of the vehicle is drawn in the direction indicated by the arrow Y1 (leftward in FIG. 4A). Namely, the initial position and the direction of the vehicle V1 with respect to the target parking boundary 52 are estimated. The current position estimation unit 132 may estimate the current position of the vehicle V1 by a global navigation satellite system (GNSS).

Figure 4B:
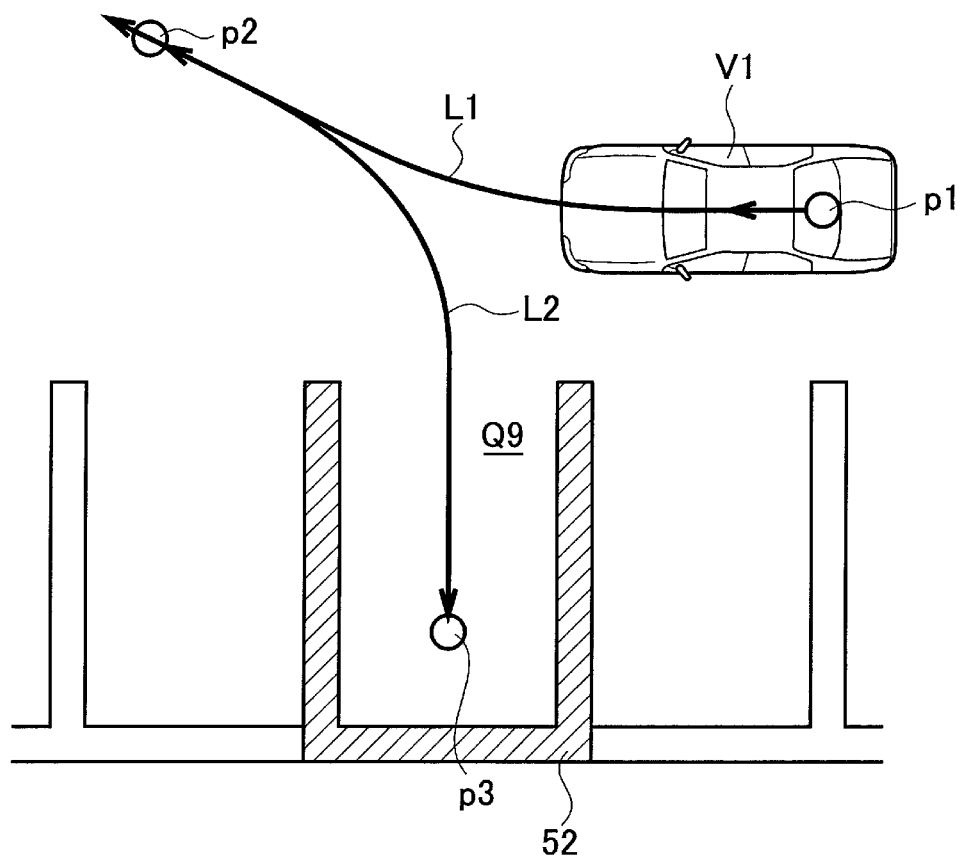
FIG. 4B is a view showing an example of an image including the vehicle, the boundary of the parking space as a parking target, and a parking trajectory.

The parking route generation unit 133 calculates a route from the parking start position set by the parking start position setting unit 131 to the position at which the vehicle V1 completes the parking in the target parking boundary 52, and generates an image indicating the route on the peripheral image of the vehicle V1. The parking route generation unit 133 displays the generated image on the display unit 3. As shown in FIG. 4B, for example, routes L1 and L2 are displayed starting from the parking start position p1 of the vehicle V1 to a parked position p3 allotted in the target parking boundary 52. In addition, a switching position p2 (a position at which the forward movement is switched to the backward movement) is also displayed.

The follow-up control unit 134 calculates a target steering angle for leading the vehicle V1 to travel on the basis of the current position along the parking routes L1 and L2 set by the parking route generation unit 133, and outputs the calculated angle to the steering angle control unit 41. The steering angle control unit 41 outputs a control command to the actuator 5 so as to set the steering angle of the vehicle to the target steering angle.

The target speed generation unit 135 calculates a target speed for leading the vehicle V1 to travel along the parking routes L1 and L2, and outputs the calculated speed to the speed control unit 42. The speed control unit 42 outputs a control command to the actuator 5 so as to set the speed of the vehicle to the target speed.

As used in the present embodiment, the term "autonomous driving" refers to a state in which at least one of the actuators including the brake (braking), the accelerator (driving), and the steering wheel (steering) is controlled without being operated by the driver. The rest of the actuators can be operated by the driver as long as at least one actuator is being controlled. As used in the present embodiment, the term "manual driving" refers to a state in which the driver operates the brake, the acceleration, and the steering wheel so as to take necessary actions for traveling. The execution of the autonomous driving can reduce the operating load of the occupant who parks the vehicle.

[Explanation of Determination of Running on Parking Spaces]

The process of determination of whether the vehicle intrudes on parking spaces made by the display switch control unit 125 is described below. According to the present embodiment, the vehicle V1 is determined to intrude on parking spaces when the distance between the vehicle and the edge of the parking boundary of the corresponding parking spaces is zero, and the length of the parking boundary is a predetermined distance L11 (a second threshold) or less. The predetermined distance L11 is preferably set to be slightly shorter than an average length of parking boundaries.

Figure 5A:
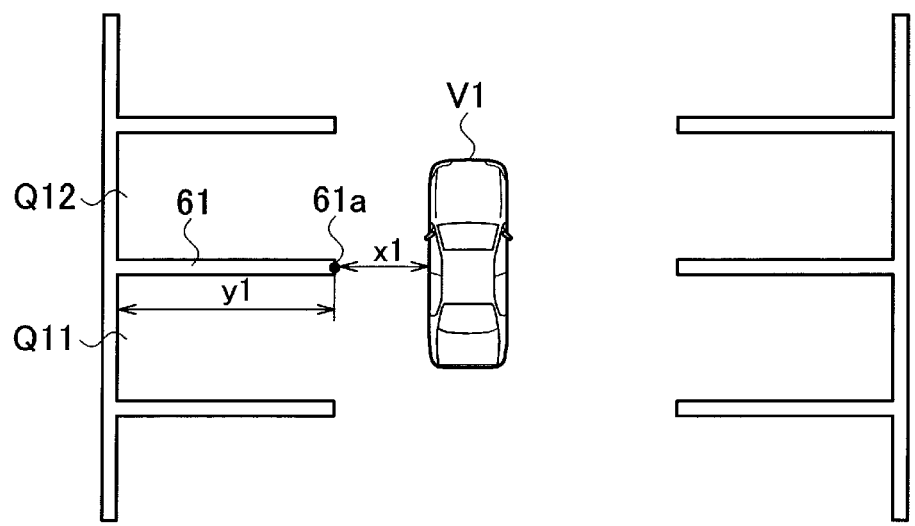
FIG. 5A is an explanatory view showing a positional relationship between the vehicle and a parking boundary when the vehicle is determined not to run on the parking boundary.

FIG. 5A is an explanatory view schematically showing a state in which the vehicle V1 is traveling at a position away from the parking spaces Q11 and Q12. The position of the parking boundary 61 separating the parking spaces Q11 and Q12 may be detected by extracting white lines from the images captured by the cameras 2a to 2d, for example, or may be detected with a spatial perceptive sensor such as a LRF.

As shown in FIG. 5A, the distance x1 between the vehicle V1 and the edge 61a of the parking boundary 61 adjacent to the vehicle V1 is calculated. The length y1 of the parking boundary 61 is also calculated. The vehicle V1 is separated from the edge 61a by the distance x1 which is not zero. The length y1 of the parking boundary 61 is also the predetermined distance L11 or greater, so that the vehicle V1 is determined not to run on the parking boundary 61 or not to intrude on the unoccupied parking spaces Q2 and Q3 separated by the parking boundary 61. Namely, the unoccupied parking spaces Q2 and Q3 are recognized as available unoccupied parking spaces.

Figure 5B:
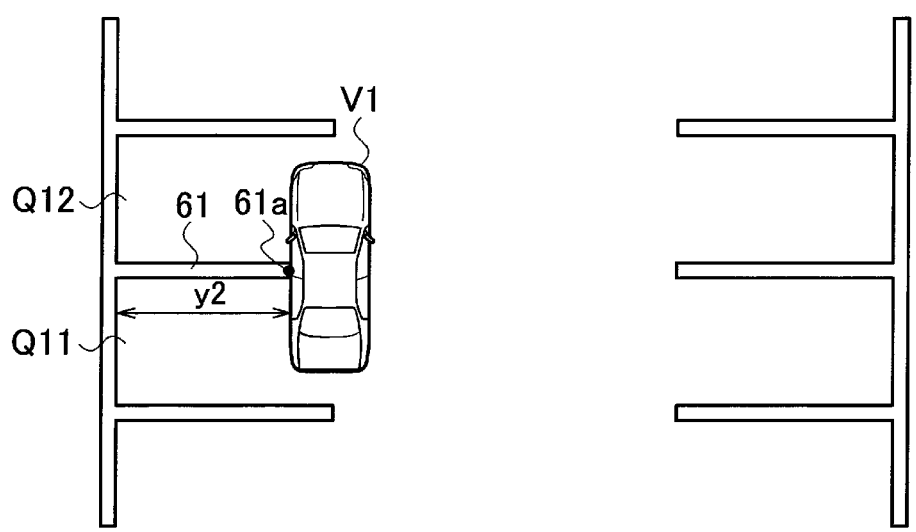
FIG. 5B is an explanatory view showing a positional relationship between the vehicle and the parking boundary when the vehicle is determined to run on the parking boundary.

When the vehicle V1 runs on the parking boundary 61, as shown in FIG. 5B, the distance between the vehicle V1 and the edge 61a of the parking boundary 61 is zero. The length y2 of the parking boundary 61 detected is shorter than the entire length of the parking boundary 61 (shorter than the length y1 shown in FIG. 5A) because of the vehicle V1 running on the parking boundary 61. Since the length y2 is shorter than the predetermined distance L11, the vehicle V1 is determined to intrude on the unoccupied parking spaces Q2 and Q3 separated by the parking boundary 61. The unoccupied parking spaces Q2 and Q3 are excluded from the available parking spaces, or are not set to be a parking recommended space.

[Explanation of Operation of First Embodiment]

The operation of the parking assistance device according to the first embodiment is described below with reference to the flowchart shown in FIG. 6. The operation of the parking assistance device according to the first embodiment is illustrated with the case of displaying the assistance image indicating the parking recommended space.

For example, when the vehicle V1 enters the parking lot D1 including a plurality of parking spaces, as shown in FIG. 2, the unoccupied parking space detection unit 121 in step S11 detects parking boundaries 61 based on the overhead image around the vehicle V1 generated by the peripheral image generation unit 11.

In step S12, the unoccupied parking space detection unit 121 specifies unoccupied parking spaces.

In step S13, the display switch control unit 125 determines whether the vehicle intrudes on unoccupied parking spaces by the above-described methods. In other words, the display switch control unit 125 determines whether the vehicle V1 overlaps with unoccupied parking spaces.

When the vehicle V1 overlaps with the unoccupied parking spaces, the display switch control unit 125 excludes the overlapping unoccupied parking spaces from available parking spaces in step S14. As shown in FIG. 5B, the parking spaces Q11 and Q12 on which the vehicle V1 intrudes are difficult to park in. In addition, the length of the corresponding parking boundary 61 is the predetermined distance L11 or less, which may lead to the processing of incorrectly linking the parking boundary 61 with noise generated in the image to result in wrong recognition of the parking spaces. The display switch control unit 125 thus avoids detecting the unoccupied parking spaces on which the vehicle is determined to intrude as available parking spaces, and inhibits the corresponding unoccupied parking spaces from being displayed as available parking spaces on the display unit 3. The other unoccupied parking spaces excluding the unoccupied parking spaces on which the vehicle intrudes are recognized as available parking spaces accordingly.

In step S15, the parking recommendation setting unit 123 detects a parking recommended space among the available unoccupied parking spaces. As described above, the parking recommendation setting unit 123 sets the unoccupied parking space determined to be easiest to park in as the parking recommended space, in accordance with the various conditions such as a shorter time required for parking and a shorter distance to move. The parking recommendation setting unit 123 may set the parking recommended space based on any other conditions.

In step S16, the assistance image generation unit 124 generates assistance images indicating the available unoccupied parking spaces and an assistance image indicating the parking recommended space. The image composition unit 14 combines these assistance images with the overhead image to display the combined image on the display unit 3. For example, the assistance images 22 indicating the available unoccupied parking spaces and the assistance image 21 indicating the parking recommendation image are displayed on the overhead image, as shown in FIG. 2. The occupant of the vehicle V1 thus can visually check the respective assistance images 21 and 22, so as to recognize the positions of the available unoccupied parking spaces and the parking recommended space.

In step S17, the assistance image generation unit 124 sets the target parking boundary to park in and the parking method. When the occupant checking the overhead image indicating the assistance images 21 and 22 selects and executes the operation with the input interface 6, the target parking boundary and the parking method such as backward parking or forward parking are determined.

In step S18, the parking route generation unit 133 confirms the current position of the vehicle V1, and generates a parking route based on the parking start position set by the parking start position setting unit 131. The image indicating the parking route is then displayed on the display unit 3. For example, as shown in FIG. 4B, the parking routes L1 and L2 are displayed that the vehicle V1 follows to move from the current position p0 to reach the parking start position p1, and further move to the parked position p3 in the target parking boundary 52 via the switching position p2.

In step S19, the parking control is started. The steering angle control unit 41 and the speed control unit 42 output the control signals to the actuator 5 so that the vehicle V1 moves from the current position p0 to the parking start position p1, and further moves to the switching position p2 along the parking route L1.

In step S20, the vehicle is determined whether to reach the switching position p2. When the vehicle V1 reaches the switching position p2, gearshift switching control is executed in step S21. In particular, the gearshift is changed from the forward gear to the reverse gear.

In step S22, the target parking boundary 52 is again confirmed, so as to reverse the vehicle V1 along the parking route L2. In step S23, the vehicle V1 is determined whether to reach the parked position p3 in the target parking boundary 52. When the vehicle V1 reaches the parked position p3, the operation of the actuator 5 is stopped to keep the parked state in step S24.

As described above, the assistance image 21 is displayed when the vehicle V1 enters the parking lot D1, and the control of parking the vehicle in the target parking boundary 52 once specified is then executed.

The parking assistance method according to the first embodiment of the present invention described above determines whether the vehicle V1 runs on a parking boundary 61 (unoccupied parking spaces). The parking assistance method then excludes the unoccupied parking spaces (Q2 and Q3 shown in FIG. 3) separated by the parking boundary 61 on which the vehicle V1 runs, from the other unoccupied parking spaces on which the assistance images are to be displayed. Namely, when the vehicle V1 intrudes on unoccupied parking spaces, the assistance images are not allotted to the corresponding unoccupied parking spaces displayed on the display unit 3.

The assistance images thus can be prevented from being indicated on the unoccupied parking spaces on which the vehicle V1 intrudes. When the vehicle V1 intrudes on the unoccupied parking spaces, the detected length of the parking boundary 61 between the corresponding parking spaces is shortened, which may prevent the assistance images from being displayed at appropriate positions to indicate the available unoccupied parking spaces. The parking assistance method thus inhibits the assistance images from being indicated on the unoccupied parking spaces on which the vehicle intrudes, so as to display a parking recommended space appropriately. When the vehicle V1 intrudes on the unoccupied parking spaces, the position of the parking boundary 61 could be estimated to generate a simulated line so as to detect available unoccupied parking spaces. According to the present embodiment, however, the assistance images are inhibited from being indicated on the unoccupied parking spaces on which the vehicle intrudes, so as to remove the necessity of generating such a simulated line to avoid linking with another simulated line incorrectly, preventing wrong detection of unoccupied parking spaces. The assistance images thus can be displayed at appropriate positions when the vehicle V1 intrudes on unoccupied parking spaces.

The parking assistance method determines that the vehicle V1 intrudes on the unoccupied parking spaces when the distance from the vehicle V1 to the edge 61a of the parking boundary 61 is zero, and the length of the parking boundary 61 is the predetermined distance L11 (the second threshold) or less, so as to achieve the detection of the presence of the vehicle V1 on the parking boundary 61 with high accuracy. The parking assistance method thus can make a determination of whether the assistance images should be displayed or inhibited appropriately, depending on the parking conditions.

The embodiment described above has been illustrated with the case in which the parking recommended space is chosen by the operation of the occupant after the assistance image 21 indicating the parking recommended space is displayed, so as to move the vehicle to park in the selected parking recommended space by autonomous driving. The present invention, however, is not limited to this case, and the vehicle may be parked in the parking recommended space by autonomous driving at the point when the parking recommended space is determined.

The above first embodiment makes the determination of whether the vehicle V1 intrudes on the unoccupied parking spaces in accordance with the distance from the vehicle V1 to the edge 61a of the parking boundary 61, and the length of the parking boundary 61. The present invention is not intended to be limited to this determination method, and may make the determination of whether the vehicle V1 intrudes on unoccupied parking spaces by any other method.

Figure 7A:
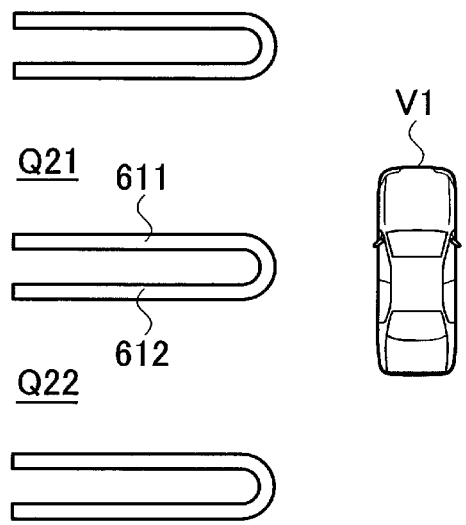
FIG. 7A is an explanatory view showing an example in which each parking boundary is doubled.

While the above first embodiment has been illustrated with the case in which the parking boundary 61 separating two unoccupied parking spaces is a single line, the parking boundary may have any profile. The first embodiment can also be applied to a case of doubled parking boundaries 611 and 612 as shown in FIG. 7A, for example. When the vehicle V1 is located on the two parking boundaries 611 and 612, both of the unoccupied parking spaces Q21 and Q22 are excluded from the available unoccupied parking spaces. When the vehicle is located on the one parking boundary 611, the unoccupied parking space Q21 is only excluded from the available unoccupied parking spaces.

Figure 7B:
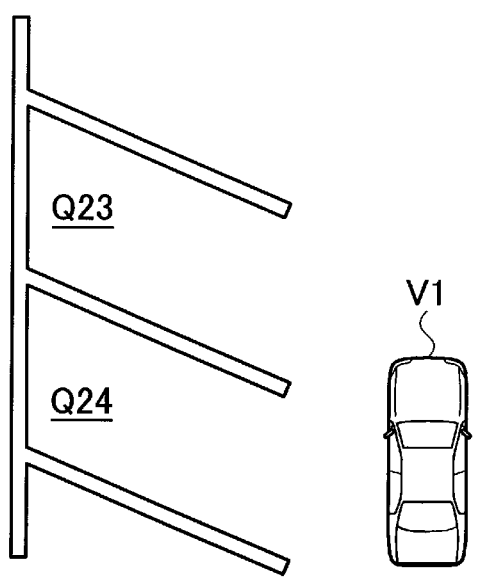
FIG. 7B is an explanatory view showing an example in which parking boundaries incline to the traveling road of the vehicle.

The present embodiment is also applicable to a case in which parking spaces are inclined to the traveling direction of the vehicle V1, as shown in FIG. 7B, so as to exclude the unoccupied parking spaces Q23 and Q24 from the available unoccupied parking spaces when the vehicle V1 intrudes thereon.

The above first embodiment excludes the unoccupied parking spaces Q2 and Q3 on which the vehicle V1 intrudes, as shown in FIG. 3, from the available unoccupied parking spaces. The other unoccupied parking spaces Q1 and Q4 adjacent to the respective unoccupied parking spaces Q2 and Q3 may further be excluded from the available unoccupied parking spaces.

The respective parking boundaries 61 separating the unoccupied parking spaces Q2 and Q3 from the respective adjacent unoccupied parking spaces Q1 and Q4 are not hidden by the vehicle V1 but are completely exposed, and the probability of wrongly detecting the positions of the unoccupied parking spaces is thus low. However, since the unoccupied parking spaces Q1 and Q4 are close to the respective unoccupied parking spaces Q2 and Q3, the difficulty in the operation for parking can be increased. The unoccupied parking spaces Q1 and Q4 are thus also excluded from the available unoccupied parking spaces or the parking recommended space. Such exclusion can allow the assistance images to be displayed on the other unoccupied parking spaces easier to park in.

[Explanation of Second Embodiment]

A second embodiment according to the present invention is described below. The second embodiment determines whether unoccupied parking spaces are available in accordance with a relative positional relationship between the vehicle V1 and the corresponding unoccupied parking spaces. The determination is described below with reference to the graph shown in FIG. 8.

Figure 8:
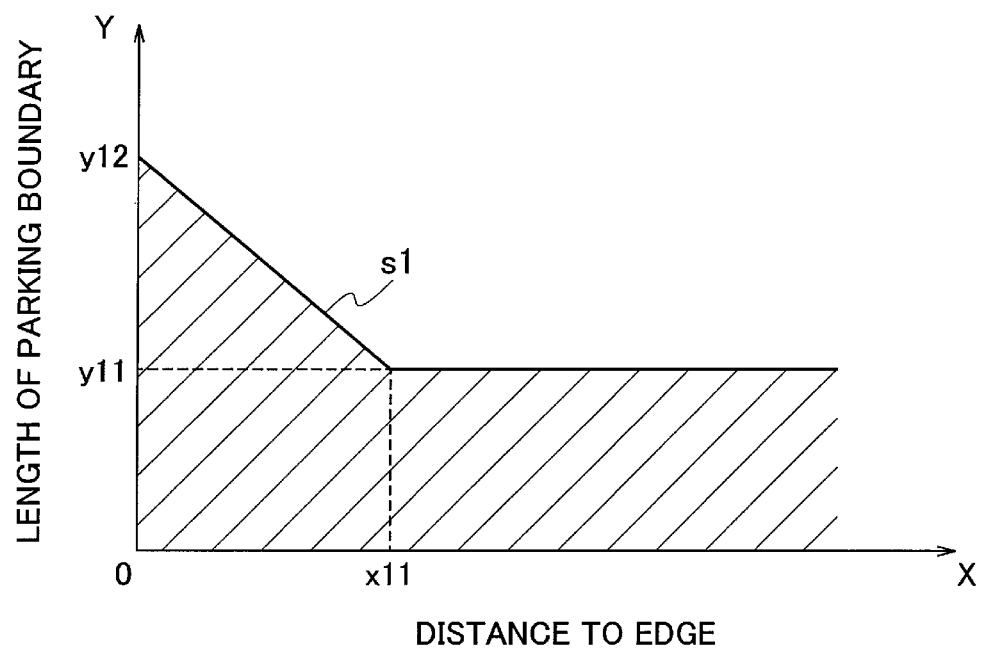
FIG. 8 is a graph plotting a distance from the vehicle to an edge of a parking boundary on the axis of abscissas and a threshold of a length of the parking boundary on the axis of ordinates.

FIG. 8 is a graph plotting a distance X from the vehicle V1 to the edge 61a of the parking boundary 61 (boundary line) (a distance between the moving object and the edge of the boundary line between the unoccupied parking spaces) on the axis of abscissas, and plotting a threshold of the length Y of the parking boundary 61 (a length of the parking boundary between the unoccupied parking spaces) on the axis of ordinates. When the relationship between X and Y fulfills the conditions in the region below the curve s1 (the shaded region), the corresponding unoccupied parking spaces are not set to be available unoccupied parking spaces. The curve s1 is a first threshold.

The first threshold is compared with the length of the parking boundary between the unoccupied parking spaces so as to determine whether to display the assistance images depending on the comparison result. The assistance images indicating the available parking spaces, the parking recommended space, and the target parking boundary are inhibited from being indicated on the unoccupied parking spaces in which the length of the parking boundary is the first threshold or less. The specific processing is described below.

As shown in FIG. 8, when the distance X is zero (meters), the threshold of the length Y of the parking boundary 61 is set to y12 (3 meters, for example). When the distance X from the vehicle V1 to the edge 61a of the parking boundary 61 is x11, the threshold of the length Y is set to y11 (1.5 meters, for example). When the distance X is in the range from zero to x11, the threshold of the length Y is set so as to continuously vary within the range of y12 to y11.

For example, the parking boundary 61, when having the length of y12 (3 meters, for example) or greater, has less probability of being influenced by image noise to result in wrong detection, even though the distance X is zero. This case is determined to indicate the accurate parking spaces, so as not to exclude the corresponding unoccupied parking spaces from the available unoccupied parking spaces. Namely, the vehicle V1 is determined not to run on the parking boundary 61. When the length of the parking boundary 61 is less than y12 (when below the curve s1), the vehicle V1 is determined to run on the parking boundary 61.

When the length Y of the parking boundary 61 is less than y11 (when below the curve s1), the probability that the vehicle V1 runs on the parking boundary 61 is high regardless of the distance X from the vehicle V1 to the edge 61a, including the case in which the distance from the vehicle V1 to the edge 61a is greater than zero. In other words, the probability of partly missing detecting the parking boundary 61 is high between the vehicle V1 and the edge 61a. In this case, the unoccupied parking spaces separated by the corresponding parking boundary 61 are not set to be available unoccupied parking spaces.

The parking assistance method according to the second embodiment described above determines whether the unoccupied parking spaces should be set to be available unoccupied parking spaces depending on the relative positional relationship between the vehicle V1 and the parking boundary 61. This can detect the available unoccupied parking spaces more accurately, so as to indicate the unoccupied parking space easier to park in as a parking recommended space.

Further, the unoccupied parking spaces when having a distance of the predetermined first threshold or less from the vehicle are inhibited from being indicated as the available parking spaces, the parking recommended space, or the target parking boundary, so as to indicate only appropriate unoccupied parking spaces accordingly.

[Explanation of Third Embodiment]

A third embodiment according to the present invention is described below with reference to FIG. 9. The configuration of the device differs from that shown in FIG. 1 in the processing by the assistance image generation unit 124. The assistance image generation unit 124 according to the third embodiment generates, in addition to the assistance image 21 indicating the parking recommended space, a parking-available marker 23 indicating that there are unoccupied parking spaces in the parking lot D1, and outputs the image to the display switch control unit.

Figure 9:
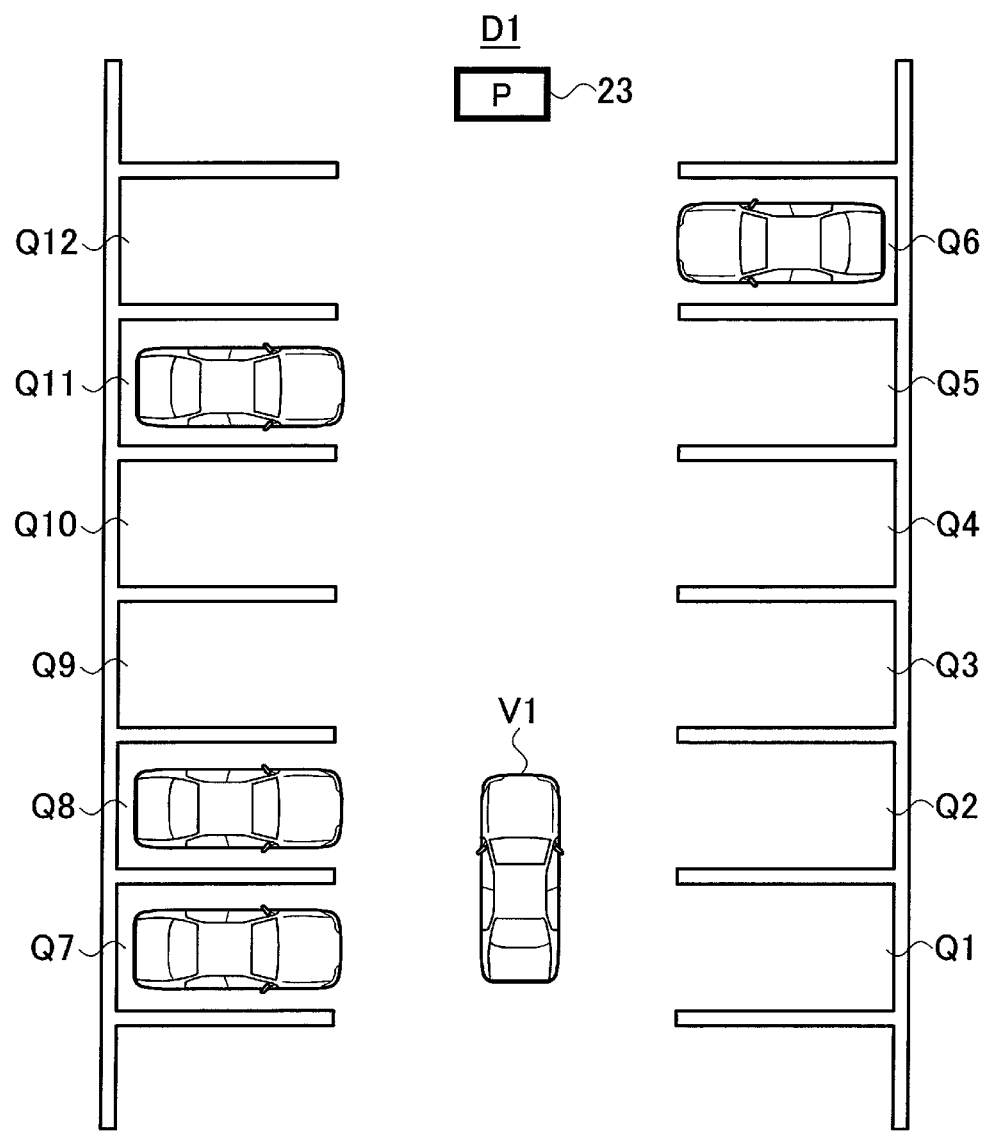
FIG. 9 is an explanatory view showing an example in which a parking-available marker is indicated on an overhead image.

When the vehicle V1 enters to move forward in the parking lot D1 while unoccupied parking spaces are detected, a parking-available marker 23 is displayed at a predetermined position in the overhead image (a position different from the unoccupied parking spaces Q1 to Q12), as shown in FIG. 9. When the vehicle V1 then make a stop, the indication is switched so as to display the assistance image 21 on the parking recommended space among the detected unoccupied parking spaces, as shown in FIG. 2. As used herein, the expression "the vehicle makes a stop" refers to a state in which the speed is zero kilometers per hour or a predetermined threshold or lower. The other configurations are the same as those shown in FIG. 1, and specific explanations are not repeated below.

[Explanation of Operation of Third Embodiment]

Figure 10:
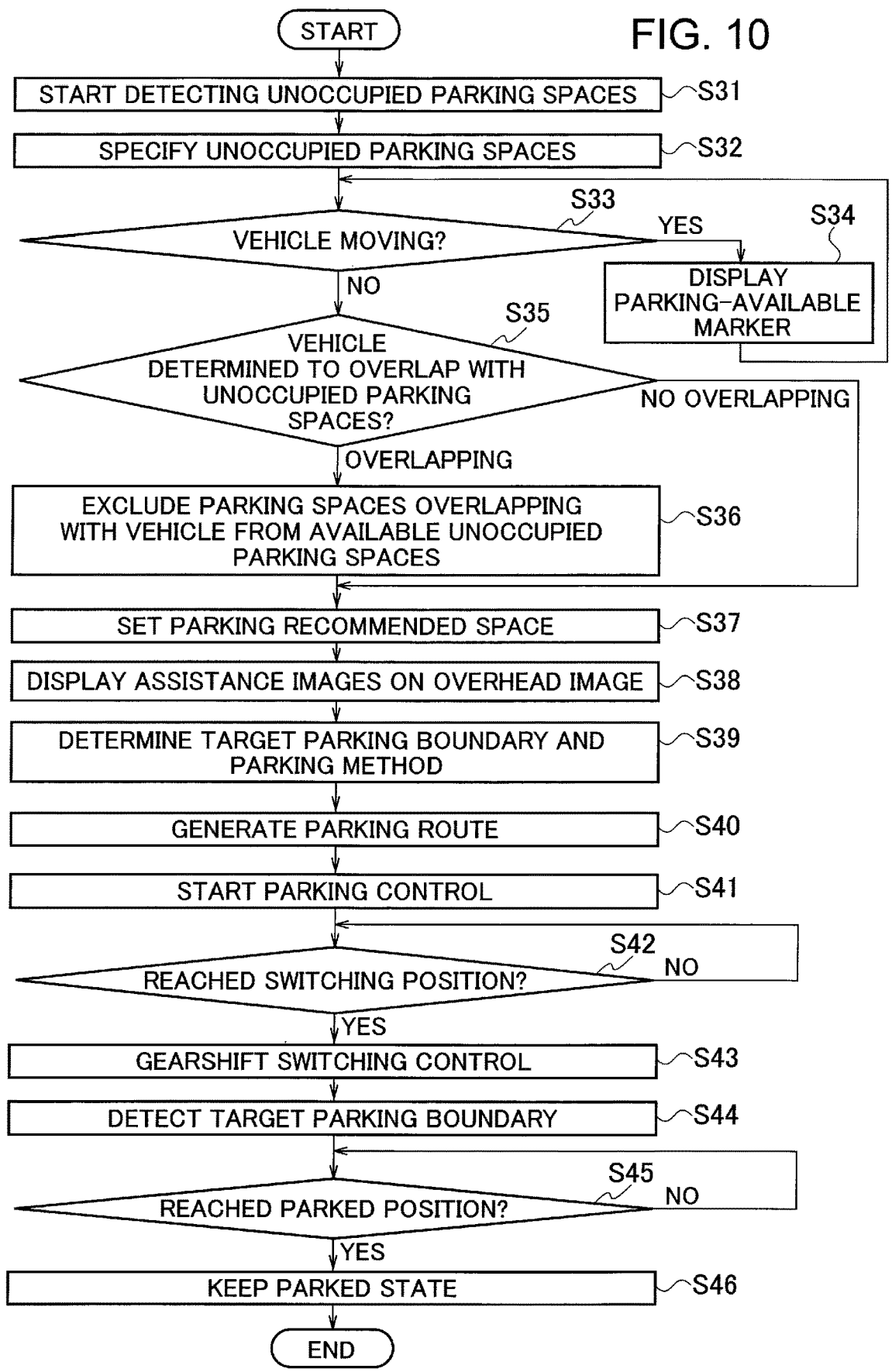
FIG. 10 is a flowchart showing a process of processing executed by a parking assistance device according to a third embodiment of the present invention.

The operation of the parking assistance device according to the third embodiment is described below with reference to the flowchart shown in FIG. 10. When the vehicle V1 enters the parking lot D1 including a plurality of parking spaces, the unoccupied parking space detection unit 121 in step S31 detects parking boundaries 61 based on the overhead image around the vehicle V1 generated by the peripheral image generation unit 11.

In step S32, the unoccupied parking space detection unit 121 specifies unoccupied parking spaces.

In step S33, the display switch control unit 125 determines whether the vehicle V1 is moving or stopping in accordance with the detection result of the wheel speed sensor 8.

When the vehicle V1 is moving, the parking-available marker 23 indicating the presence or absence of unoccupied parking spaces is displayed on the overhead image in step S34, as shown in FIG. 9. The parking-available marker 23 is displayed at a position not overlapping with the unoccupied parking spaces included in the overhead image. The parking-available marker 23 is displayed in color when there is at least one unoccupied parking space in the parking lot D1, and is displayed in black and white when there is no unoccupied parking space. The occupant thus can recognize the presence or absence of the unoccupied parking spaces depending on the displayed mode of the parking-available marker 23. The color of the parking-available marker 23 may vary depending on the presence or absence of the unoccupied parking spaces.

When the vehicle V1 is making a stop, the display switch control unit 125 determines whether the vehicle V1 intrudes on the unoccupied parking spaces.

The process from step S35 to step S46 is the same as the process from step S13 to step S24 shown in FIG. 6, and overlapping explanations are not repeated below. Regarding step S38, the assistance images are displayed instead of the parking-available marker 23, which is not displayed when the vehicle V1 is stopping.

The parking assistance method according to the third embodiment described above displays the parking-available marker 23 at an appropriate position (at a position not overlapping with the unoccupied parking spaces) when the vehicle V1 entering the parking lot D1 is moving to detect the unoccupied parking spaces. The occupant thus can recognize the presence or absence of the unoccupied parking spaces in the parking lot D1.

When the vehicle V1 makes a stop, the assistance images 21 and 22 as shown in FIG. 2 are indicated, instead of the parking-available marker 23. As in the case of the first embodiment described above, the unoccupied parking spaces difficult for the vehicle V1 to park in can be prevented from being indicated as the available unoccupied parking spaces or the parking recommended space. The third embodiment can also avoid the problem of detecting the parking boundary 61 having a shorter length than the others because of the vehicle V1 running on the corresponding parking boundary 61 to be incorrectly linked with another simulated line due to the influence of image noise, so as not to detect wrong unoccupied parking spaces as available unoccupied parking spaces. The available parking spaces, the parking recommended space, and the target parking boundary thus can be displayed with high accuracy regardless of whether the vehicle V1 intrudes on the unoccupied parking spaces.

The respective embodiments described above have been illustrated with the case in which the overhead image is used as a peripheral image, but may use a bird's-eye image which is an image viewed from a visual point obliquely above the vehicle, instead of the overhead image. The peripheral image may be a bird's-eye image that indicates the periphery of the vehicle as viewed from above, other than the overhead image. Such a case may use a three-dimensional vehicle image indicating the vehicle from a visual point as viewed obliquely above, and three-dimensional assistance images indicating parking spaces from a visual point as viewed obliquely above. To display the three-dimensional assistance images, three-dimensional data on the assistance images are stored, so as to generate the assistance images based on the three-dimensional data according to the visual point (both two-dimensional data). The peripheral image used in the respective embodiments are not necessarily captured by the cameras mounted on the vehicle, and may be captured by cameras installed around the parking spaces.

The respective embodiments can be applied to other moving objects other than an automobile, and specific examples of moving objects include an industrial vehicle (such as a truck), an airplane, an aircraft, an underwater moving object (such as an underwater probe and a submarine), an inverted pendulum machine, and a vacuuming robot. The parking process according to the above embodiments is applicable to an airplane, an aircraft, or an underwater moving object when moving to an unoccupied space to make a stop such that an unoccupied space easier to stop at is selected from plural unoccupied spaces to determine a recommended space so as to display an assistance image indicating the determined recommended space.

The parking process is also applicable to an inverted pendulum machine or a vacuuming robot when moving to an unoccupied space (including a charging space) to make a stop such that an assistance image indicating a recommended space is generated so as to be displayed to an occupant or an operator.

The display device according to the embodiments for indicating the assistance images and the peripheral image to the occupant is not necessarily mounted on the vehicle (the moving object), and may be any device that displays the images, such as a mobile phone or a smart device.

While the present invention has been described above by reference to the embodiments, it should be understood that the present invention is not intended to be limited to the descriptions and the drawings composing part of this disclosure. Various alternative embodiments, examples, and technical applications will be apparent to those skilled in the art according to this disclosure.

REFERENCE SIGNS LIST

1 CONTROLLER
2a, 2b, 2c, 2d CAMERA
3 DISPLAY UNIT
4 VEHICLE CONTROL ECU
5 ACTUATOR
6 INPUT INTERFACE
7 STEERING ANGLE SENSOR
8 WHEEL SPEED SENSORS SPATIAL PERCEPTIVE SENSOR
11 PERIPHERAL IMAGE GENERATION CIRCUIT
12 TARGET PARKING SPACE SETTING CIRCUIT
13 PARKING ASSISTANCE CONTROL CIRCUIT
14 IMAGE COMPOSITION UNIT
21, 22 ASSISTANCE IMAGE
23 PARKING-AVAILABLE MARKER
41 STEERING ANGLE CONTROL UNIT
42 SPEED CONTROL UNIT
52 TARGET PARKING BOUNDARY
61 PARKING BOUNDARY
61a EDGE
121 UNOCCUPIED PARKING SPACE DETECTION UNIT
123 PARKING RECOMMENDED SPACE SETTING UNIT
124 ASSISTANCE IMAGE GENERATION UNIT
125 DISPLAY SWITCH CONTROL UNIT

The invention claimed is:

1. A parking assistance method of a parking assistance device for generating a peripheral image indicating a periphery of a moving object as viewed from above, detecting an unoccupied parking space around the moving object, and displaying, on the peripheral image, an assistance image indicating that the detected unoccupied parking space is an available parking space, the method comprising:
determining whether the moving object intrudes on the unoccupied parking space; and
inhibiting the assistance image from being displayed on the unoccupied parking space on which the moving object is determined to intrude in the peripheral image.

2. The parking assistance method of a parking assistance device according to claim 1, further comprising:
  comparing a length of a boundary line of the unoccupied parking space with a first threshold to be determined depending on a distance between an edge of the boundary line of the unoccupied parking space and the moving object so as to determine whether to display the assistance image on the unoccupied parking space in accordance with a comparison result;
  detecting the distance between the edge of the boundary line of the unoccupied parking space and the moving object, and the length of the boundary line of the unoccupied parking space; and
  inhibiting the assistance image from being displayed on the unoccupied parking space when the length of the boundary line is the first threshold or less.

3. The parking assistance method of a parking assistance device according to claim 1, further comprising:
  detecting a distance between an edge of a boundary line of the unoccupied parking space and the moving object; and
  determining that the moving object intrudes on the unoccupied parking space when the distance is a predetermined second threshold or less.

4. The parking assistance method of a parking assistance device according to claim 1, further comprising:
  detecting a distance between an edge of a boundary line of the unoccupied parking space and the moving object; and
  determining that the moving object intrudes on the unoccupied parking space when the distance is zero.

5. The parking assistance method of a parking assistance device according to claim 1, further comprising inhibiting the assistance image from being displayed on another unoccupied parking space adjacent to the unoccupied parking space on which the moving object is determined to intrude.

6. The parking assistance method of a parking assistance device according to claim 1, further comprising, when the moving object is moving, displaying a parking-available marker indicating that the unoccupied parking space is detected at a predetermined position different from the unoccupied parking space in the peripheral image indicating a region including the moving object as viewed from above.

7. The parking assistance method of a parking assistance device according to claim 6, further comprising displaying the assistance image, instead of displaying the parking-available marker, when the moving object makes a stop.

8. A parking assistance device comprising:
  a controller configured to:
    generate a peripheral image indicating a periphery of a moving object as viewed from above;
    detect an unoccupied parking space around the moving object;
    generate an assistance image indicating that the detected unoccupied parking space is an available parking space;
  determine whether the moving object intrudes on the unoccupied parking space; and
  inhibit the assistance image from being displayed on the unoccupied parking space on which the moving object is determined to intrude in the peripheral image; and
  a display configured to display the assistance image on the peripheral image.

* * * * *